United States Patent
Fitzgerald et al.

[15] 3,687,400
[45] Aug. 29, 1972

[54] METHOD AND APPARATUS FOR PROVIDING A RETRACTABLE MULTI-TRUCK INLINE LANDING GEAR FOR HEAVY AIRCRAFT

[72] Inventors: John M. Fitzgerald, Monroe; Varnell L. James, Enumclaw, both of Wash.

[73] Assignee: The Boeing Company, Seattle, Wash.

[22] Filed: Aug. 12, 1970

[21] Appl. No.: 36,387

[52] U.S. Cl. .............................................244/102 R
[51] Int. Cl. .........................B64c 25/04, B64c 25/34
[58] Field of Search...............................244/102, 100

[56] References Cited

UNITED STATES PATENTS

| | | |
|---|---|---|
| 3,511,456 | 5/1970 | Fehring et al..........244/102 R |
| 2,559,451 | 7/1951 | McBrearty.............244/102 R |
| 2,630,990 | 3/1953 | Kanode et al. ........244/102 SL |
| 2,921,759 | 1/1960 | Elkin et al..............244/102 R |

FOREIGN PATENTS OR APPLICATIONS 1,467,923  12/1966  France...................244/102 R

OTHER PUBLICATIONS

Aviation Week & Space Technology, Dec. 27, 1965. Pages 46–47 relied on.
Aviation Week & Space Technology, Feb. 21, 1966. Pages 38–39 relied on.

Primary Examiner—Milton Buchler
Assistant Examiner—Paul E. Sauberer
Attorney—Glenn Orlob and Theron H. Nichols

[57] ABSTRACT

A retractable, main landing gear for aircraft weighing over a half million pounds comprises four trucks for four oleo struts or three trucks for three oleo struts, all trucks being on a transverse line, both when extended for loading up each oleo strut equally from the instant of touchdown, and when retracted for being positioned contiguous with each other for requiring the least amount of wheel well space. Further, all struts are mounted on trunnions secured to the rear and mid wing spars for providing a minimum of landing gear structural weight.

9 Claims, 16 Drawing Figures

Patented Aug. 29, 1972

INVENTORS,
JOHN M. FITZGERALD
VARNELL L. JAMES
BY

*Thenon H. Nichols*
AGENT

Patented Aug. 29, 1972
3,687,400
9 Sheets-Sheet 3
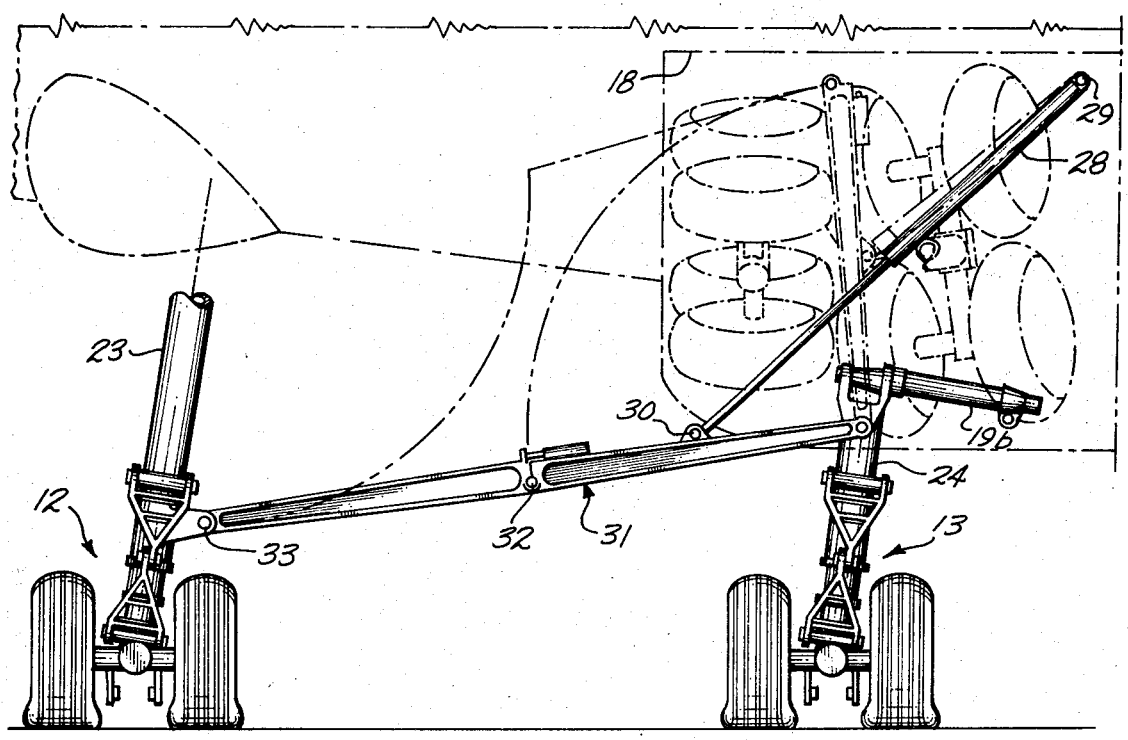
Fig. 4.
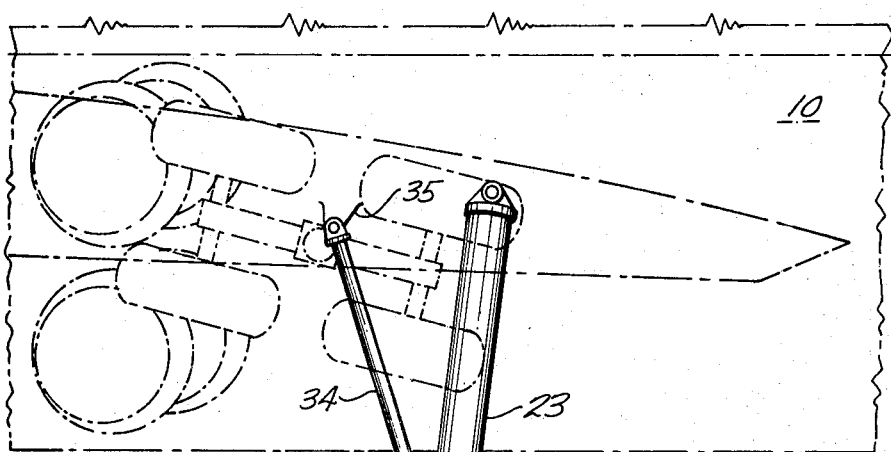
Fig. 5.
INVENTORS,
JOHN M. FITZGERALD
VARNELL L. JAMES
BY
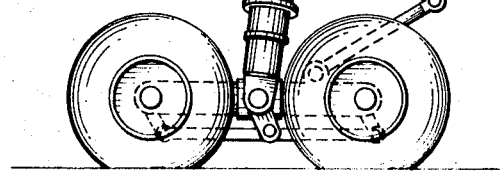
AGENT

INVENTORS,
JOHN M. FITZGERALD
VARNELL L. JAMES
BY

AGENT

Patented Aug. 29, 1972
3,687,400
9 Sheets-Sheet 5
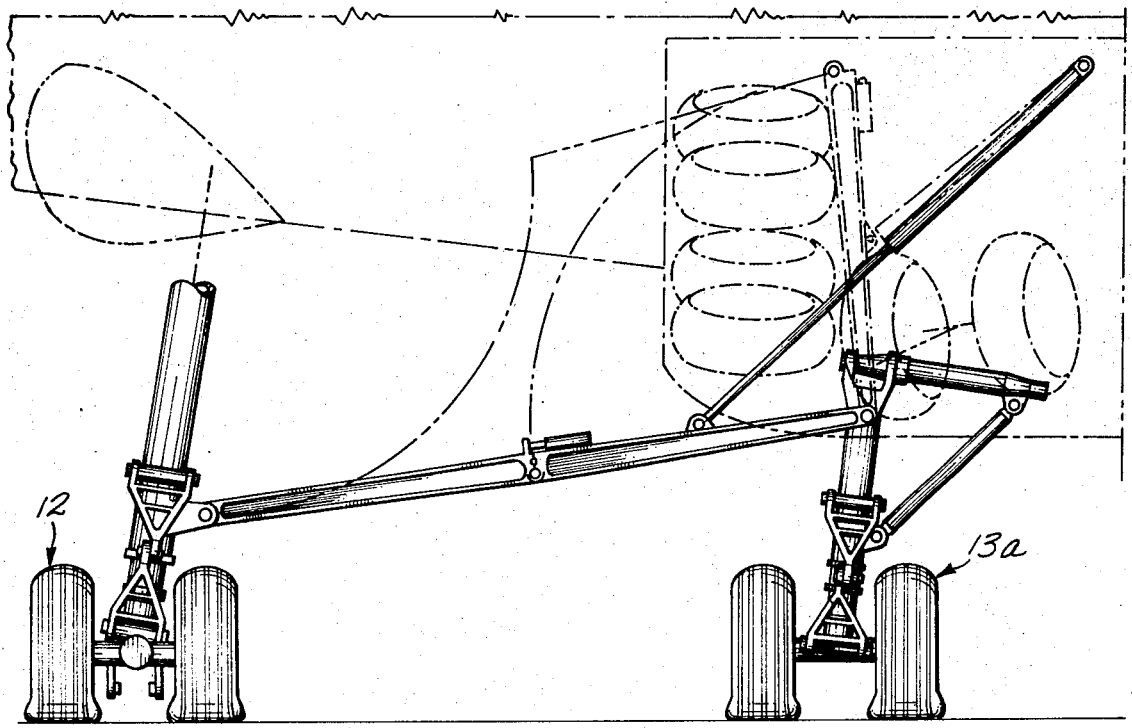
Fig. 7.
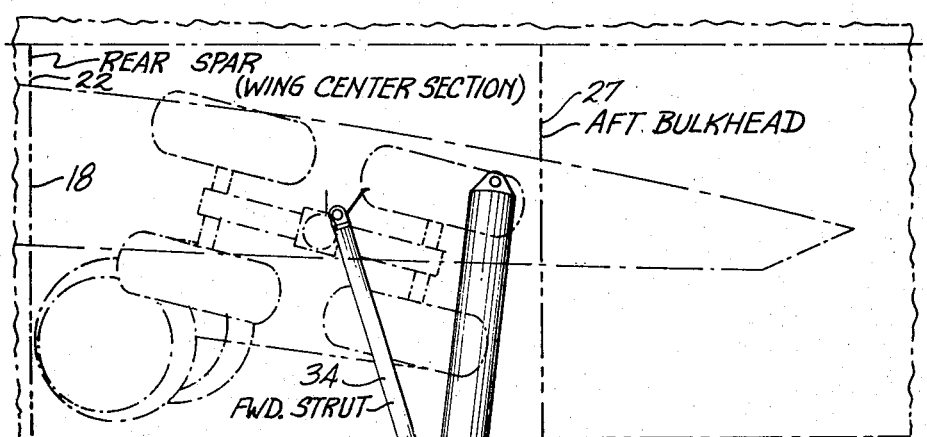
Fig. 8.
INVENTORS,
JOHN M. FITZGERALD
VARNELL L. JAMES
BY
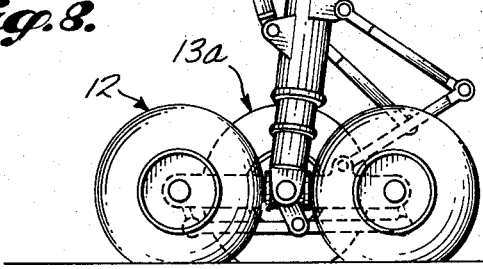
AGENT Patented Aug. 29, 1972

INVENTORS,
JOHN M. FITZGERALD
VARNELL L. JAMES
BY

Theron H. Nichols
AGENT.

INVENTORS,
JOHN M. FITZGERALD
VARNELL L. JAMES
BY

Theron H. Nichols
AGENT

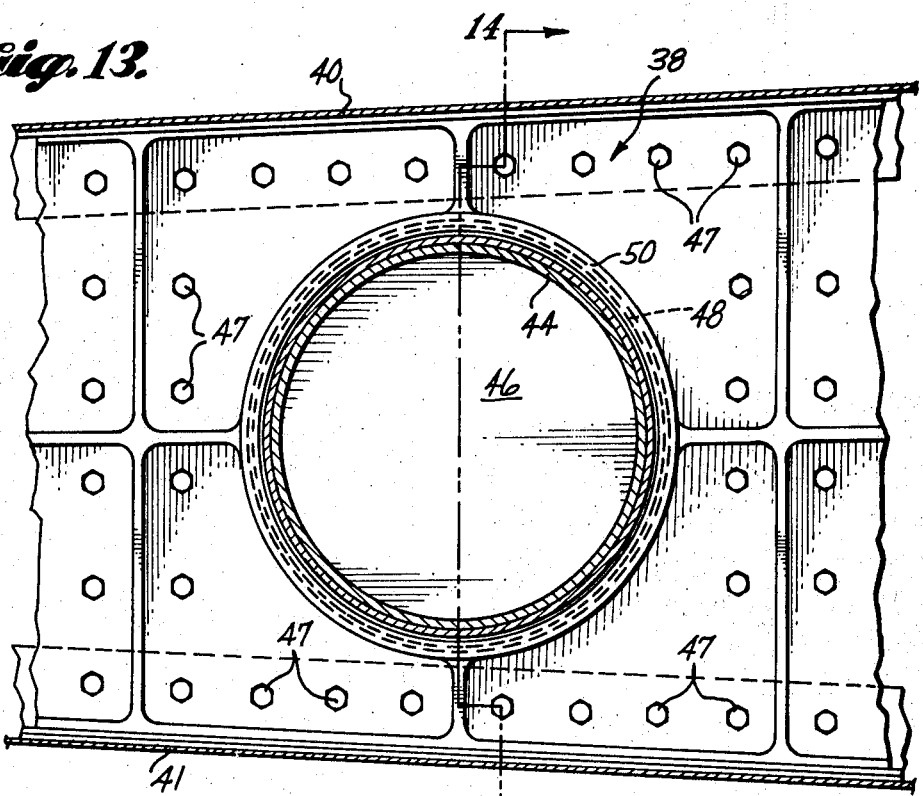
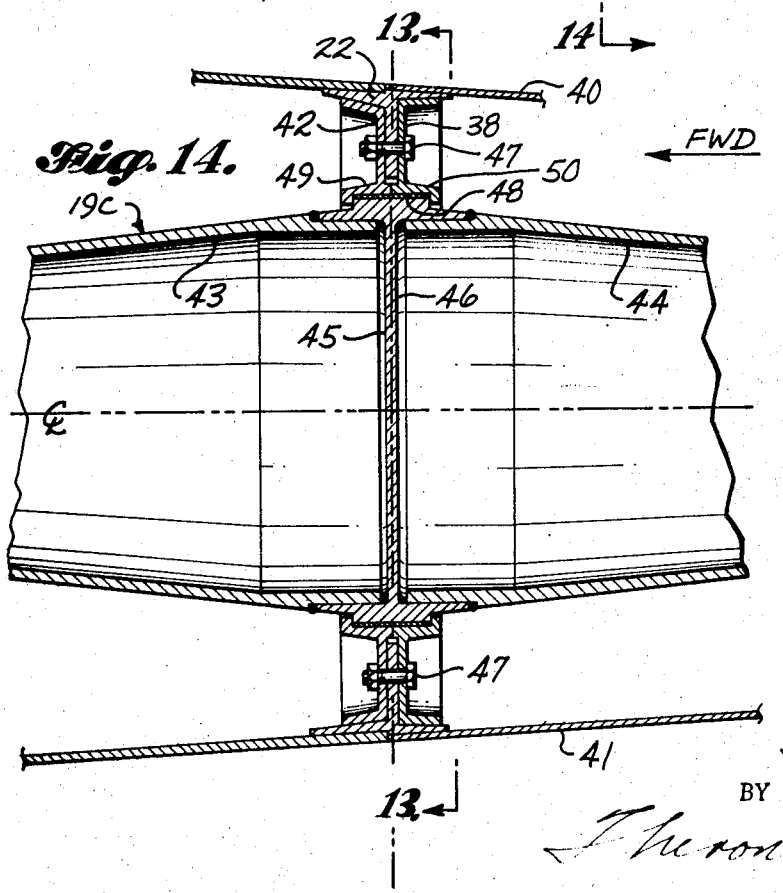

INVENTORS,
JOHN M. FITZGERALD
VARNELL L. JAMES
BY

Theron H. Nichols
AGENT

METHOD AND APPARATUS FOR PROVIDING A RETRACTABLE MULTI-TRUCK INLINE LANDING GEAR FOR HEAVY AIRCRAFT

SUMMARY OF THE DISCLOSURE

This invention pertains to an aircraft retractable main landing gear comprising both a four-truck landing gear for supporting four oleo struts, and a three-truck landing gear for supporting three oleo struts for heavy aircraft having a gross weight greater than half a million pounds.

More particularly, the disclosed landing gear is positioned in an inline position, both in extended and in retracted positions, and most important, it is retractable into one single wheel well where all four or three trucks are in juxta-position with each other and accordingly requiring only a minimum of lost, storage space.

With all trucks in the inline position, i.e., on a line transverse to the longitudinal axis of the aircraft, all landing forces are absorbed by all landing gear trucks equally when the aircraft is level for any pitch attitude. This is very important for in the conventional four strut landing gear with two forward struts and two rearward struts, a hard landing with the aircraft in any pitch attitude other than the one when all four trucks are parallel to the ground simultaneously, will overload either the forward landing gear struts or the rearward struts, whichever ones hit first. Applicants' inline landing gear trucks alleviate this problem whereby the aircraft may contact the ground at any angle of pitch and each strut carries an equal load.

This inline landing gear also provides for alleviation of tire scrubbing and excessive tire wear and for reduced engine thrust because of reduced turning moment required while taxiing. Expressing it in another manner, in making a turn as the nose wheel rolls on its turning circle, all fixed main wheel trucks roll on their respective turning circles, the feature being that all turning circles are concentric.

This invention is particularly useful on large heavy aircraft which require high thrust forces or turning moment when using brakes on one side to turn the aircraft while taxiing, and/or when all turning forces and inertia of the whole aircraft are borne by the steerable nose wheel when turning on the ground. This turning moment is significant in aircraft the size of the Boeing 747 and Boeing 2707, SST (Supersonic transport), and more particularly on the SST where the engines are close coupled to the fuselage with a correspondingly short lever arm requiring close to maximum thrust for sharp turns. Accordingly, because the disclosed landing gear trucks provide a shorter turning radius, if not zero, for the same degree of nose wheel turning, or for the same turning radius, less nose wheel turning is required with the disclosed inline main wheel trucks than without the inline main landing gear, and the engine thrust may be reduced resulting in a reduction in fuel consumption while taxiing on the ground and providing greater flight range capability.

Also, reduced thrust required on the ground means reduced noise, a problem in this time when so many people live so close to so many airports.

Accordingly, a primary object of this invention is to provide a four- or three-truck, inline extended, main landing gear that is retractable into a single wheel well wherein all trucks are contiguous with each other for requiring a minimum of landing gear storage space.

Another object of this invention is to provide an aircraft, inline, four or three oleo strut, main landing gear wherein the outer oleo struts support the wings and the inner oleo strut or struts support the fuselage for even sustentation or equal load carrying capabilities or support by each oleo strut of the landing gear, particularly for hard landings.

And still another object of this invention is to provide an aircraft, inline, four or three oleo strut, main landing gear in which all oleo struts are supported on trunnions mounted on the rear spar and the mid spar for increased weight saving.

A further object of this invention is to provide an aircraft inline, four- or three-truck main landing gear which is pivotable about the center of the landing gear or of the aircraft with a zero length turning radius with minimum scrubbing of the tires during a taxiing turn.

And a still further object of this invention is to provide an aircraft, inline four or three four-wheel truck main landing gear wherein, all of the inline trucks absorb the landing loads simultaneously.

Other objects and various advantages of the disclosed method and apparatus for providing a four- or three-truck, inline main landing gear for heavy aircraft will be apparent from the following detailed description, together with the accompanying drawings, submitted for purposes of illustration only and not intended to define the scope of the invention, reference being made for that purpose to the subjoined claims.

BRIEF DESCRIPTION OF DRAWINGS

The drawings diagrammatically illustrate by way of example, not by way of limitation, three forms of the invention wherein like reference numerals designate corresponding parts in the several views in which:

FIG. 4 is a rear view of the embodiment of FIG. 3;

FIG. 5, is a side view of the embodiment of FIG. 3;

FIG. 7, is a rear view of FIG. 6;

FIG. 8, is a side view of FIG. 6;

FIG. 13 is a detailed view of a portion of the trunnion fitting of FIG. 15;

FIG. 14 is a sectional view of the fitting taken at 14—14 on FIG. 13 showing a portion of a rotatable trunnion mounted therein;

DESCRIPTION OF THE PREFERRED EMBODIMENTS

The invention, the scope of which being defined in the appended claims, is not limited in its application to the details of construction and arrangement of parts shown and described, since the invention is capable of other embodiments and of being practiced or carried out in various other ways. Also, it is to be understood that the phraseology or terminology employed herein is for the purpose of description and not of limitation.

While the left landing gear units are shown in greater detail than the right landing gear units, the complete right wing landing gear unit including the truck, oleo strut, retracting actuator, and pivotal connections to the aircraft described hereinafter is the allochiral analogue of the left wing landing gear unit. Likewise, the complete right fuselage landing gear unit of the first two modifications is the enantiomorphic analogue of the left fuselage landing gear unit.

In all of the disclosed landing gears, each of the main landing gear trucks is fixed to roll in straight fore and aft direction and since they all are in transverse alignment, no rotating of the truck is required for turning while on the ground on any radius of curvature from infinite to zero radius, as long as the point of rotation is on the transverse line of trucks. This landing gear alleviates tire scrubbing and excessive tire wear while taxiing and reduces engine thrust required because of reduced turning moment.

Figure 1:
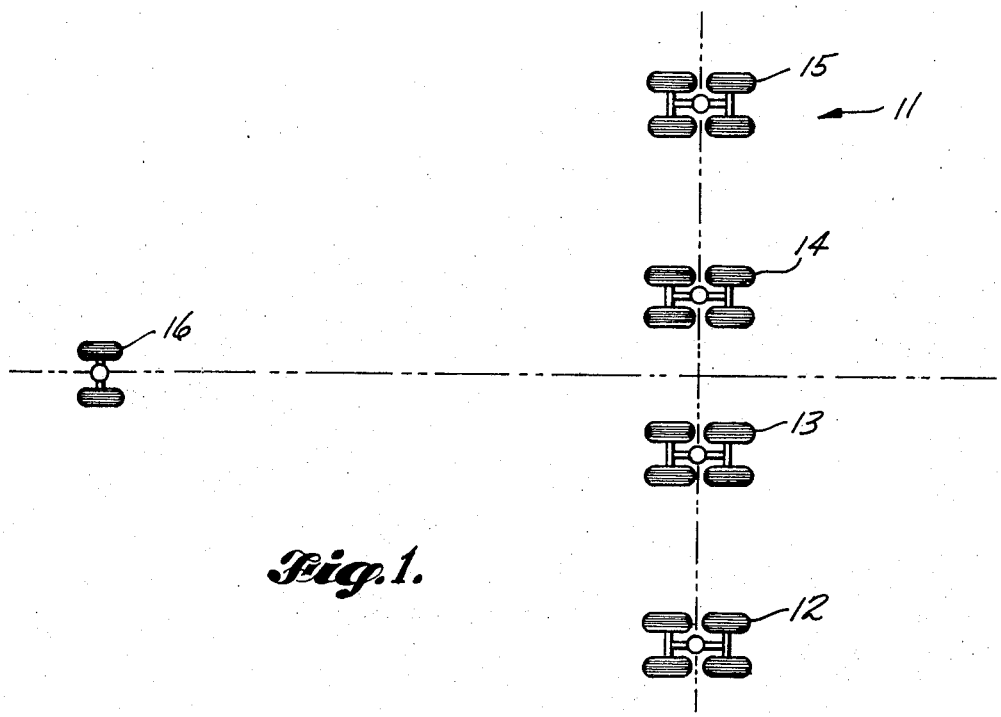
FIG. 1 illustrates schematically a plan view of the four inline, four-wheel truck main landing gear and nose wheels, all shown in extended position.

FIG. 1 schematically shows the plan view of the four inline four-wheel truck main landing gear 11 and nose wheels 16, all shown in the extended position. This four-truck main landing gear 11 comprises left outer main landing gear truck 12, inner left landing gear truck 13, inner right landing gear truck 14, and right outer landing gear truck 15. A nose wheel landing gear 16 is also illustrated. Thus the aircraft with the disclosed inline landing main landing gear does not overload any one strut when contacting the ground at any angle of pitch and each strut carries an equal load.

Figure 2:
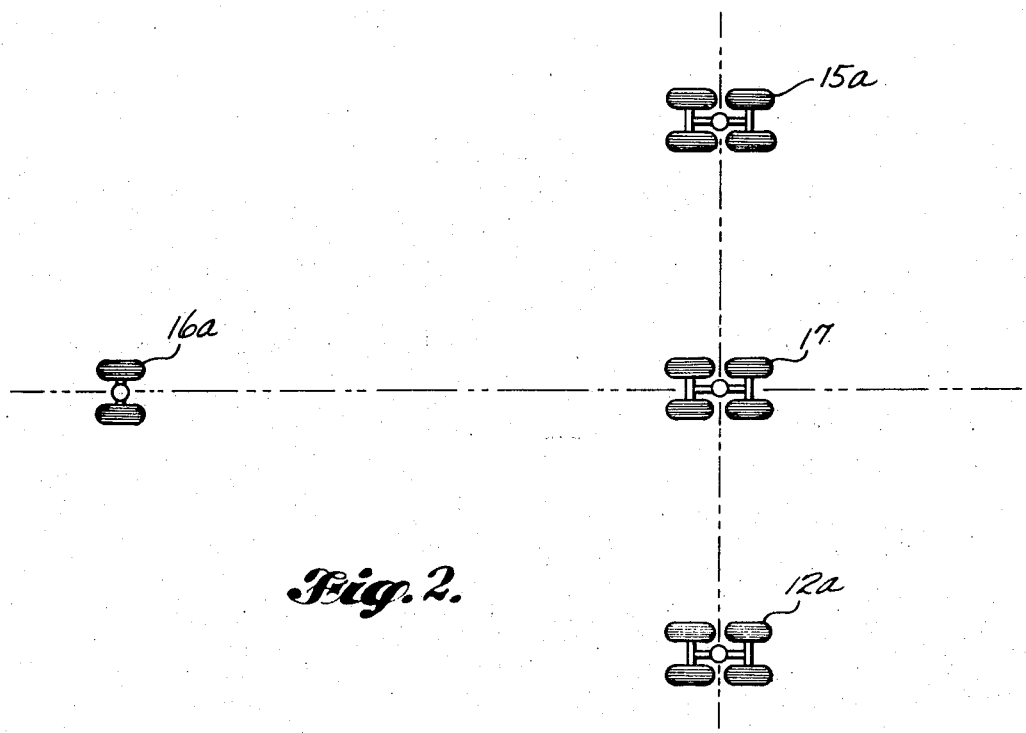
FIG. 2 illustrates schematically a plan view of the three inline, four-wheel truck main landing gear and nose wheels in extended position.

FIG. 2 illustrates a plan view of a three inline, four-wheel truck main landing gear 11a and nose wheel in extended position. The three-truck main landing gear comprises a left landing gear truck 12a, a center landing gear truck 17, and a right landing gear truck 15a. A conventional nose wheel 16a is included also.

Figure 3:
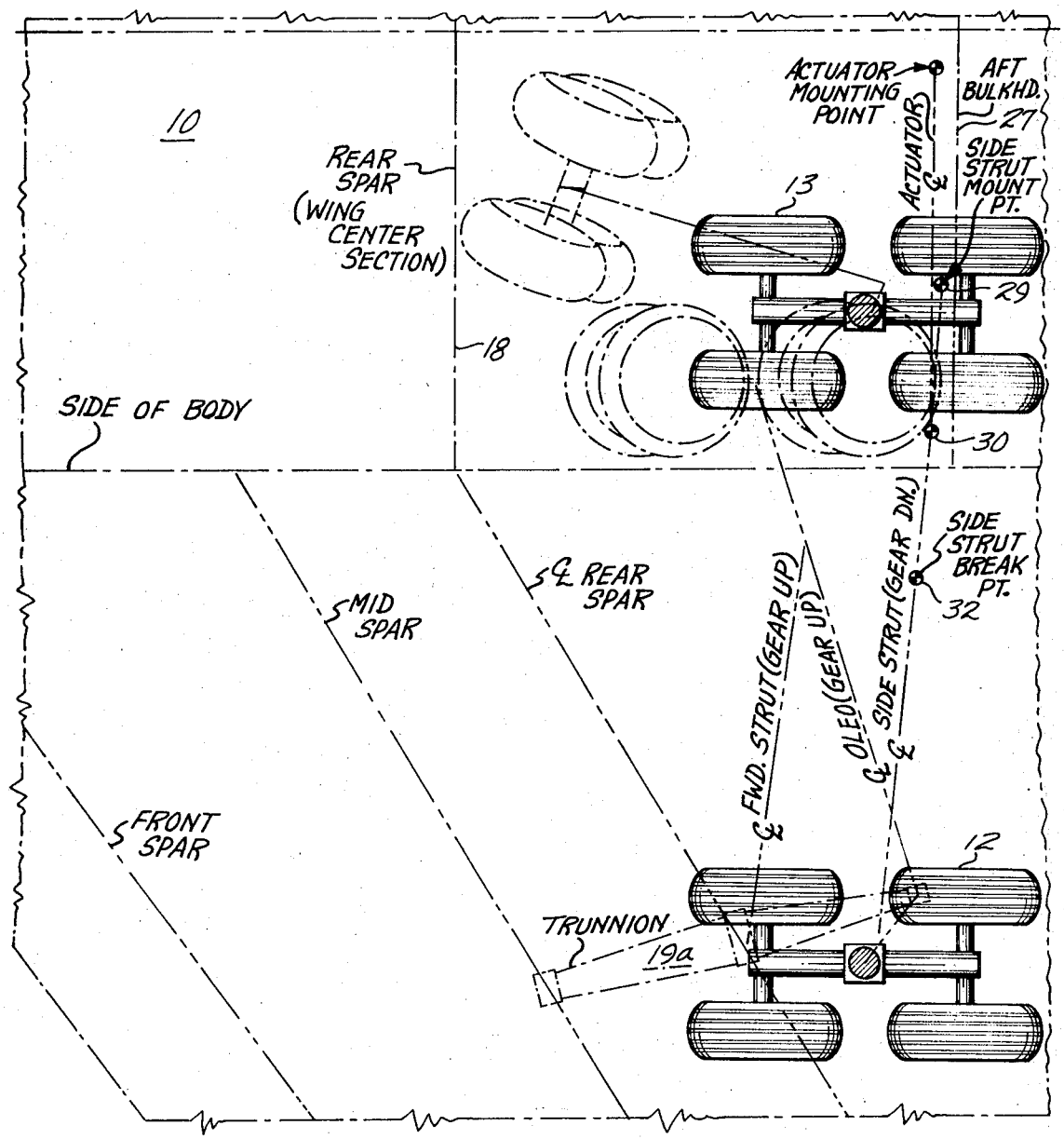
FIG. 3 illustrates schematically in enlarged plan form, the left half of the four inline four-wheel truck main landing gear embodiment of FIG. 1 and accompanying portion of the aircraft structure with the landing gear being shown in extended position in solid lines and in retracted position in broken lines.

FIG. 3 discloses the left half of the four truck main landing gear of FIG. 1 in an aircraft 10 showing the left outer truck 12 and the inner left landing gear truck 13 in solid lines in extended position and shown in broken lines in retracted position. One half of the landing gear wheel well 18 is illustrated.

FIG. 3 illustrates how the outer or wing main landing gear truck 12 is mounted to pivot on trunnion 19 fixed to the mid spar 21 and rear spar 22, front spar 20 being illustrated likewise. Rear spar also extends across the fuselage to form the forward wall of the wheel well 18 before extending similarly out the right wing to provide support for the right main landing gear wing truck.

FIG. 4 is a rear view of the embodiment of FIG. 3 showing the extended main landing gear left trucks 12 and 13 in solid lines having shock struts 23 and 24, respectively, and the retracted gear illustrated in broken lines. It may be noted how compactly the landing gears are retracted into the single wheel well 18, FIG. 4 showing only the left hand half of the wheel well with the left hand landing gear trucks 12 and 13 retracted therein.

While the outer landing gear truck 12 and shock strut 23 are pivotally mounted on trunnion 19, FIG. 3 supported by wing spars 21 and 22 for retractability, inner landing gear truck 13 and shock strut 24, FIG. 4 are pivotally mounted on trunnion 19b supported on fuselage aft bulkhead 27. For retracting the outer landing gear truck 12, a conventional actuator 28 pivotally mounted on the aircraft with pivot 29 is pivotally connected with pivot 30 to side strut 31 which is foldable about its pivot 32. The outer end of side strut 31 is connected to the outer landing gear truck 12 with pivot 33 for being folded upwardly to the retracted position in the center wheel well 18 illustrated in broken lines, FIG. 4.

FIG. 5 is a side view of the embodiment of FIG. 3 showing the extended left landing gear trucks 12 and 13 inline with each other in solid lines and the retracted landing gear trucks in broken lines. Drag strut 34 is illustrated connecting the outer shock strut 23 to a bracket 35 on the wing of the aircraft for the added purpose of rotating the retracting outer truck 12 slightly to the straight fore and aft extending, retracted position in the wheel well 18.

Figure 6:
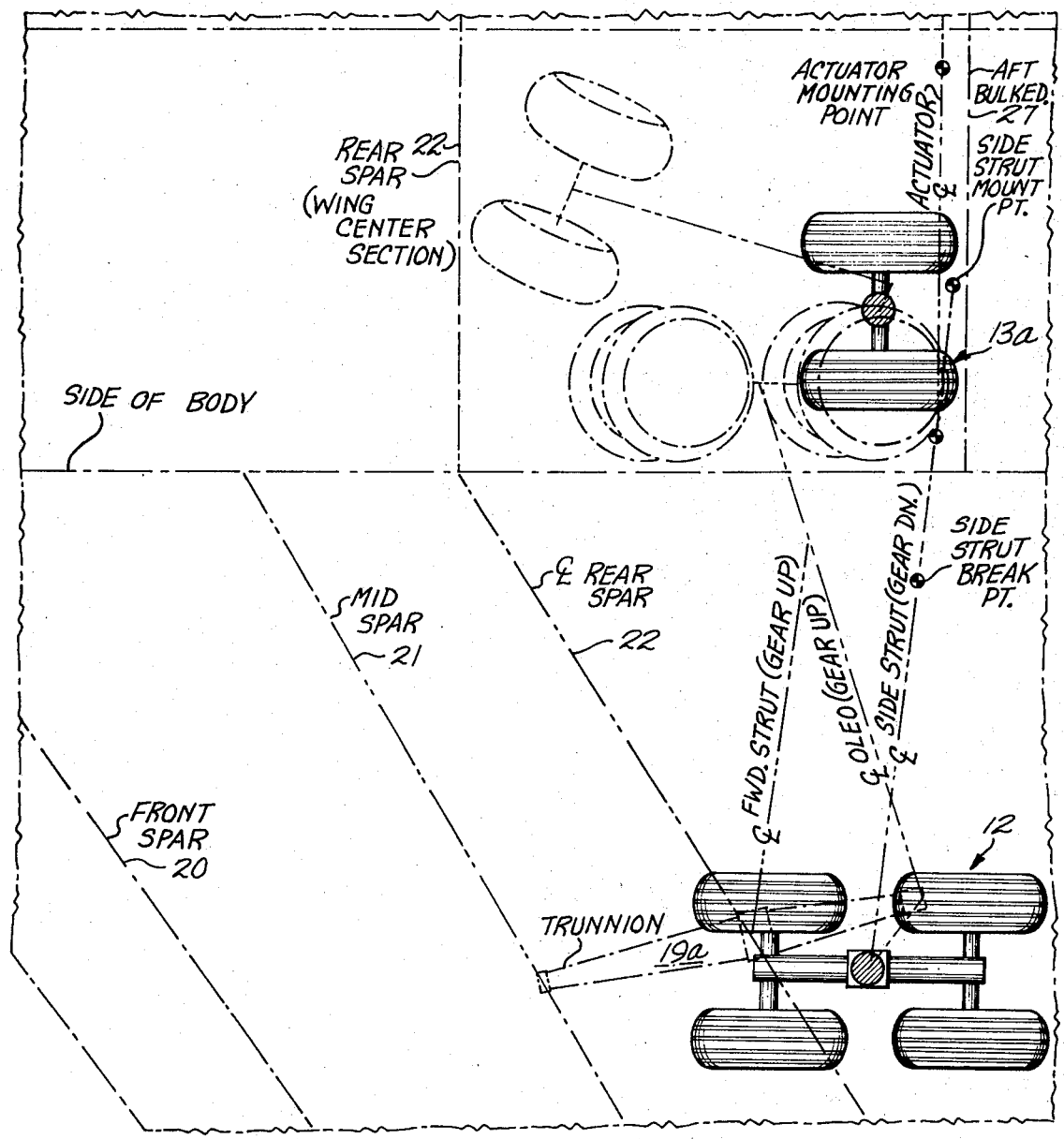
FIG. 6 illustrates schematically in plan view the left half of a modification of FIG. 1 showing a modified four inline wheel truck main landing gear which has two four-wheel trucks outboard and two two-wheel trucks inboard.

FIG. 6 illustrates in plan view the left half of a modified four, inline, wheel truck main landing gear, the outer truck of the landing gear being a four-wheel truck 12 on spar supported trunnion 19a and the inner truck being a two-wheel truck 13a, mounted on aft bulkhead 27, the landing gear being shown in solid lines in extended position and in broken lines the retracted position.

FIG. 7 is a rear view of the modified landing gear trucks of FIG. 6 for lighter aircraft showing the landing gear in extended position in solid lines and in the retracted position in broken lines utilizing similar retracting mechanism disclosed in FIG. 4 for retracting four-wheel truck 12 and two-wheel 13a.

FIG. 8 illustrates a side view of the embodiment of FIG. 6 showing in solid lines the extended position of the left outboard landing gear truck 12 and the inboard two-wheel landing gear truck 13a inline therewith. The retracted landing gear trucks in the compact wheel well 18 between the rear spar 22 and the aft bulkhead 27 are illustrated in broken lines.

Figure 9:
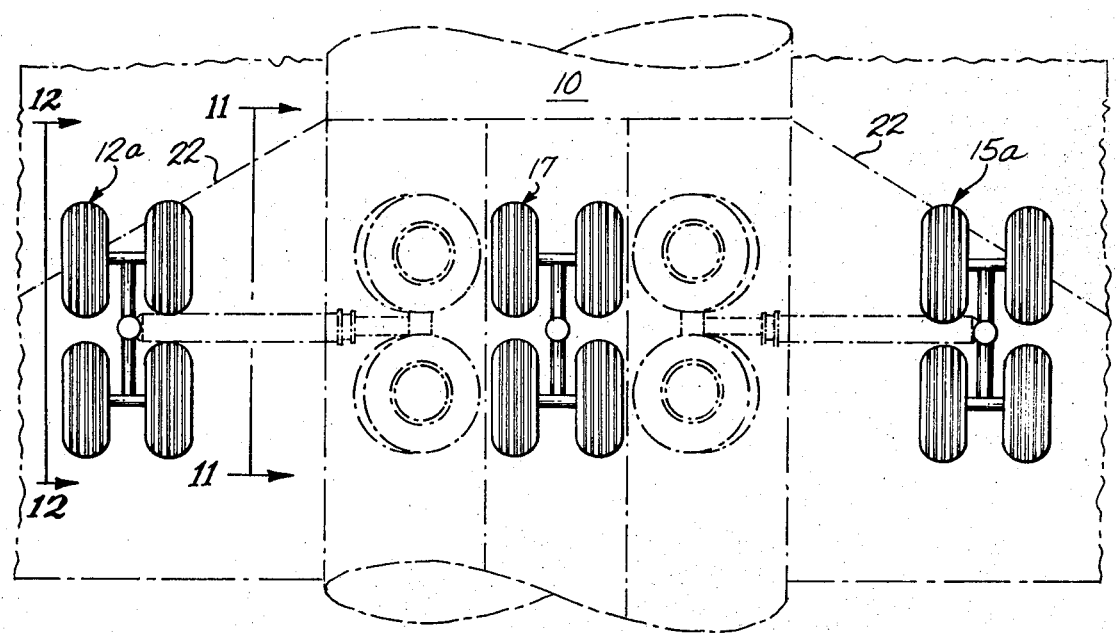
FIG. 9, illustrates schematically a plan view of the complete embodiment of FIG. 2, comprising a three inline, four-wheel truck, main landing gear shown in extended position in solid lines and the outboard wheel trucks shown in retracted position in broken lines.

FIG. 9 shows a bottom view of the modification of FIG. 2 comprising the three inline, four-wheel, main landing gear trucks which are shown in extended position in solid lines, and in retracted position in broken lines, the retracted position of the center truck not being shown, it overlying that of the extended position shown. This aircraft has all the advantages of the four strut, inline main landing gear set forth above.

The main landing gear outboard trucks 12a and 15a of FIG. 9 are positioned just rearward of the rear spar 22 and supported on trunnions (not shown) extending aft from the rear spar 22, and the mid spar (not shown in FIG. 9) similar to mid spar 21 on FIGS. 3 or 6.

Figure 10:
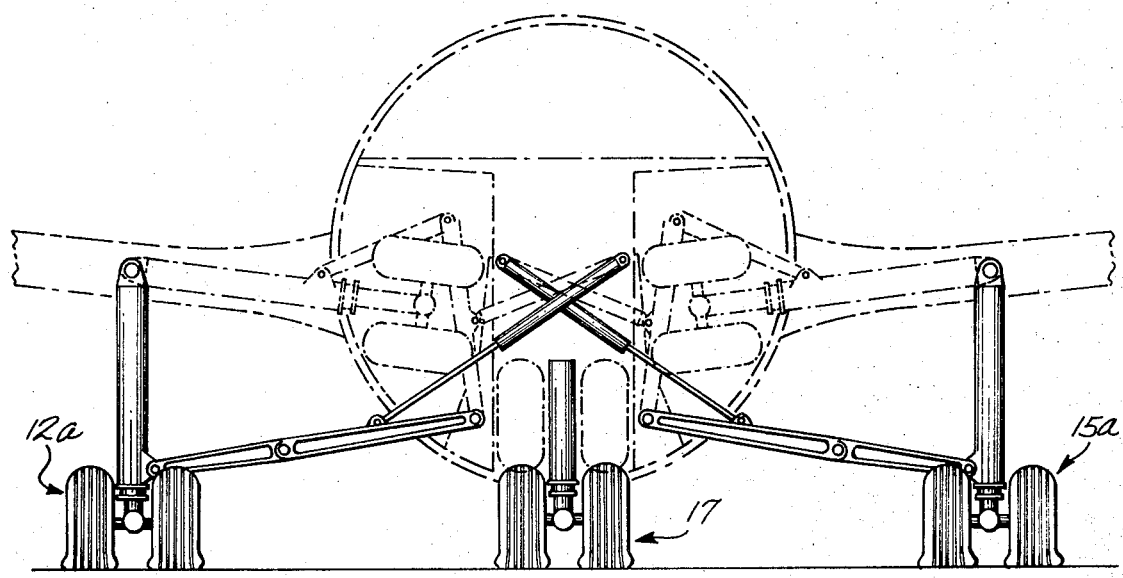
FIG. 10, is a rear view of the embodiment of FIG. 9.

FIG. 10 illustrates a rear view of the embodiment of FIG. 9 showing the extended landing gear in solid lines and the retracted landing gear position in broken lines.

Figure 11:
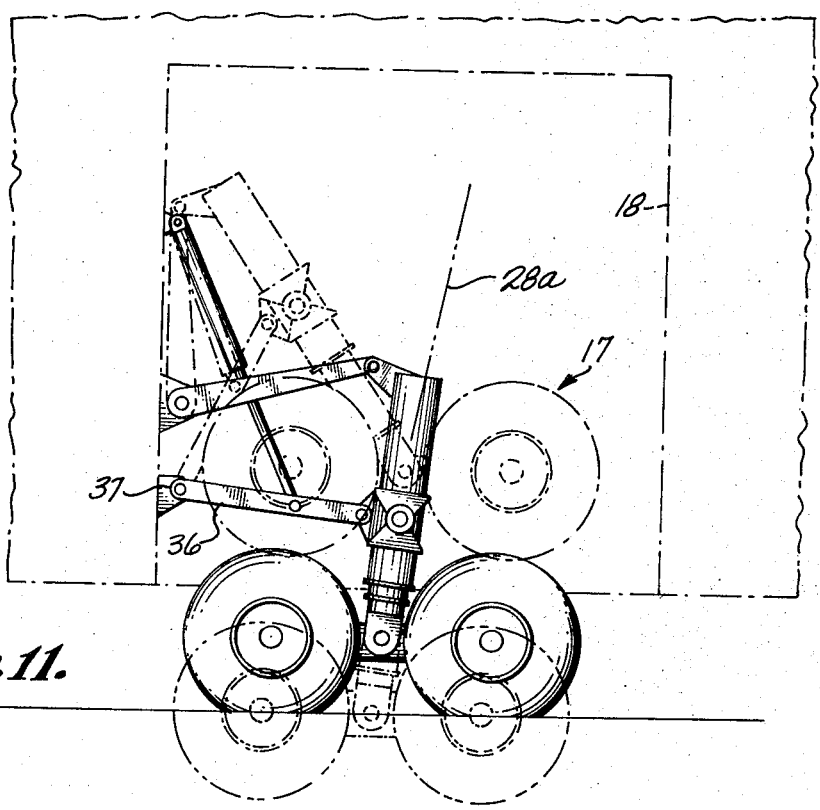
FIG. 11, is a sectional view taken at 11—11 on FIG. 9.

FIG. 11, a sectional view taken at 11–11 on FIG. 9, illustrates how retracting actuator 28a raises or retracts center truck 17 as it pivots about lever 36 fixed at one end to truck 17 and pivoted to the aircraft fuselage at the other end with pivot 37.

Figure 12:
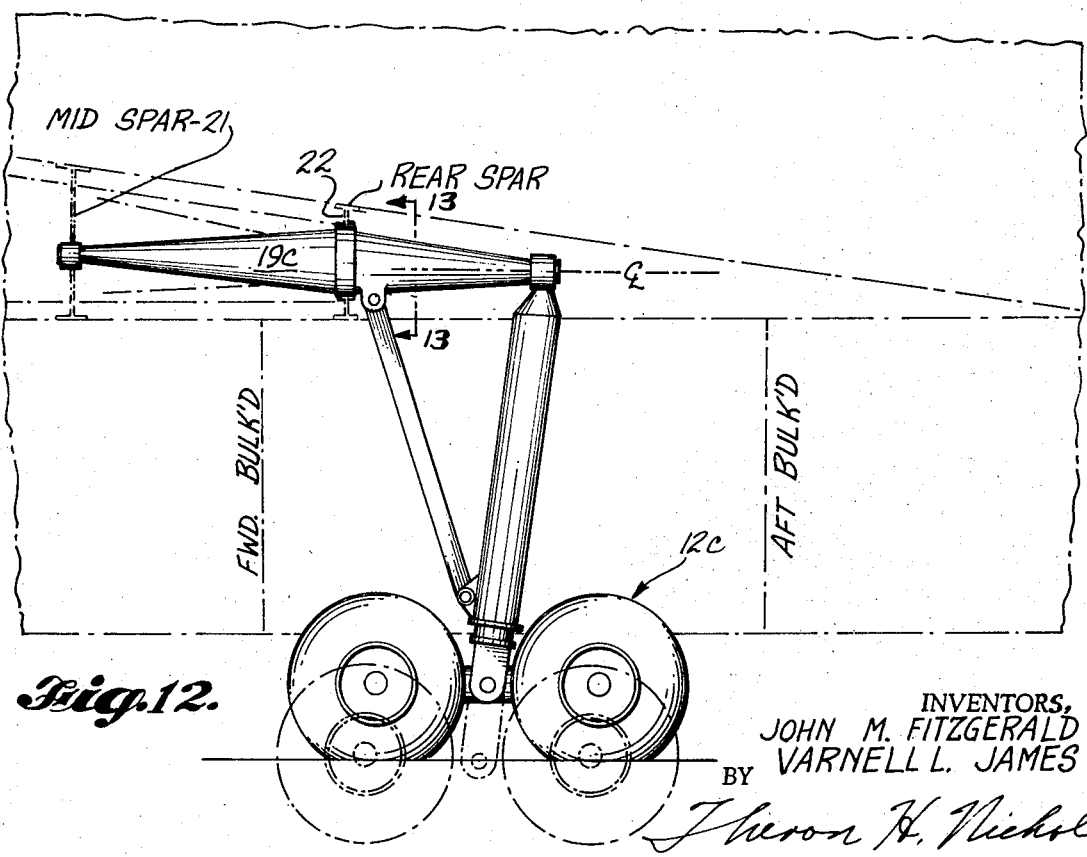
FIG. 12 is a sectional view taken at 12—12 on FIG. 9.

FIG. 12, a sectional view taken at 12–12 on FIG. 9, shows how the outer landing gear truck 12c is pivotally mounted on trunnion 19c, which in turn, is mounted on mid spar 21 and rear spar 22 for alleviating the requirement for heavy additional beaver tails above and below the wing skins as reaction points for the moments produced by the landing gear and the conventional torque boxes which load up the wing.

Figure 15:
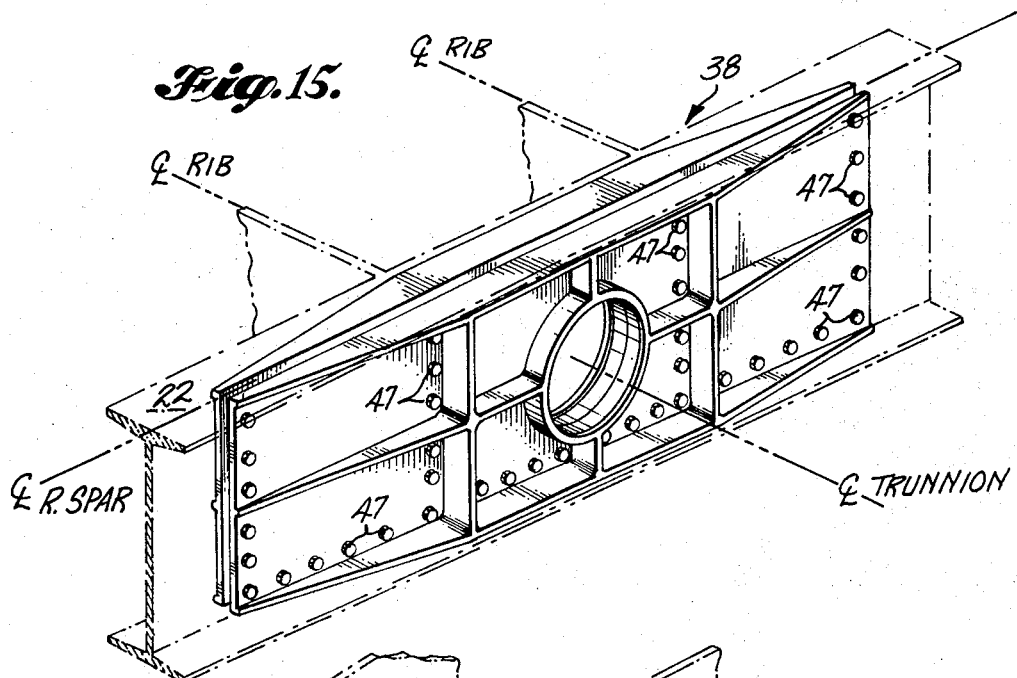
FIG. 15 is a schematic perspective view of a complete fitting for attaching a landing gear trunnion to a rear spar.

FIG. 13, a sectional view at 13–13 on FIG. 12, shows the portion of a forging or fitting 38 of FIG. 15 for circumscribing a trunnion (not shown) and connected with suitable fastening means, such as rivets 39, FIG. 15, to the rear spar 22 and a similar fitting 42 on the other side of the spar and connected to the top and bottom wing skins 40 and 41, FIG. 13 for equal distribution of the load from the landing gear trunnion into the wing.

FIG. 14, a section at 14–14 on FIG. 13, illustrates the fitting 38 in section for circumscribing the trunnion 19c and secured to the rear spar 22 with a second fitting 42, the allochiral analogue of fitting 38.

Trunnion 19c, FIG. 14, comprises fore and aft portions 43 and 44, each having secured thereto, as by welding, webs 45 and 46, respectively. Webs 45 and 46 are secured together in abutting relationship and secured to rear spar 22 with fittings 38 and 42 bolted together, as with bolts 47. Bearing means, such as but not limited to, a split bronze bearing 48 is pressed circumferentially over the peripheral surfaces of the trunnion webs 45 and 46 and under flanges 49 and 50 of trunnions 42 and 38, respectively.

Thus, the internal webs of the trunnion 19c carry the shear loads to the rear spar 22. The split bronze bearing 48 permits rotation of the trunnion within the spars.

Accordingly, fittings 38 and 42 with bearing 48 circumscribing trunnion webs 45 and 46 capture all forces of the landing gear and transfer them to the wing structure.

Figure 16:
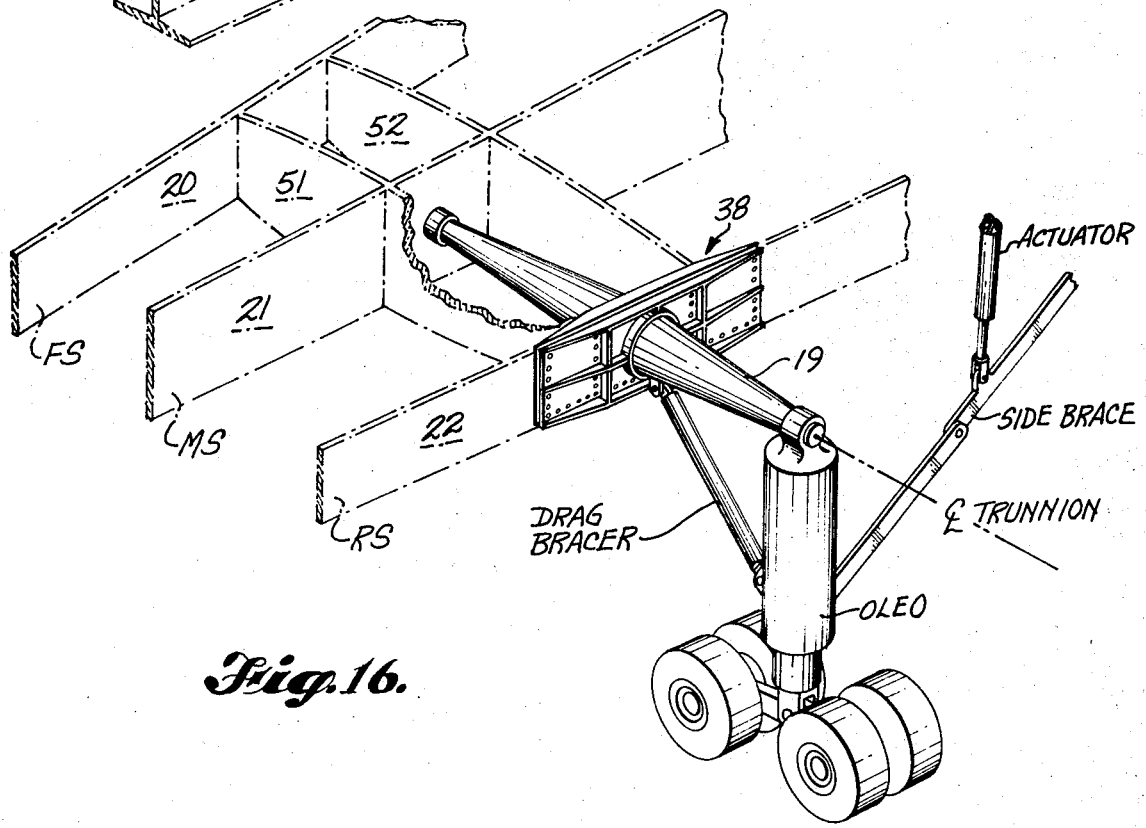
FIG. 16 is a schematic perspective view of a landing gear truck and its trunnion connections to the wing box structure.

FIG. 16 illustrates schematically how landing gear trunnion 19 is connected to mid spar 21 and rear spar 22 between two wing ribs 51 and 52.

Accordingly, it will be seen that the present method provides a few apparatuses which provide in turn a retractable, multi-truck, inline main landing gear for heavy aircraft in a manner which meets each of the objects set forth above.

Having specifically described our invention, we do not desire to confine ourselves to the specific details of the constructional example herein shown and described as it is apparent that various modifications may be resorted to without departing from the broad principles of the invention as indicated by the attached claims.

We claim:

1. A retractable multi-wheel truck main landing gear for an aircraft having a wing and fuselage comprising: a fore and an aft wing spar; a first bearing mounted internally of the aft wing spar; a second bearing mounted to the fore wing spar; a trunnion inserted internally through the aft wing spar and mounted such that the front portion of the trunnion is pivotally mounted in the second bearing supported on the fore spar, the mid portion of the trunnion is pivotally mounted in the first bearing in the aft spar, and the aft portion of the trunnion is cantilevered rearwardly off from the aft spar; a landing gear oleo strut mounted to the cantilevered aft portion of the trunnion for rotation about the trunnion axis during extension and retraction of the landing gear; a fuselage wheel well compartment; and said cantilevered trunnion rotational axis being positioned with respect to the aft wing spar so as to permit rotation of the main landing gear oleo and the multi-wheel truck attached thereto, from an extended position for landing, to a retracted position wherein the main landing gear multi-wheel truck is stowed in the fuselage wheel well compartment.

2. A landing gear as recited in claim 1 wherein said first bearing comprises: an outer and an inner race, the outer race being circumferentially split and fixedly connected internally to the aft wing spar, the inner race being fixedly connected to the midportion of the trunnion and said outer race encapsulating the inner race for rotatably mounting the midportion of the trunnion for reacting landing loads through the aft spar.

3. A landing gear as recited in claim 1 wherein the longitudinal length of said fuselage wheel well compartment is defined by an aft spar fuselage center section forming the forward limit of said compartment and a body bulkhead rearward of the aft spar fuselage center section for forming the aft limit of the wheel well compartment.

4. A landing gear as recited in claim 1 wherein the trunnion midportion, which is supported by said encapsulating first bearing, has an integral continuous web structure in the cross-section plane through the encapsulating first bearing for carrying the aft spar shear web loads continuous through the trunnion cross-section.

5. A landing gear as recited in claim 1 further comprising: a folding side brace linkage means having one end pivotally mounted to body structure and the other end being pivotally attached to the outer sleeve of the landing gear oleo strut for retracting the multi-wheel truck main landing gear into the opening in the underside of the fuselage.

6. A retractable three post multi-wheel truck main landing gear for an aircraft having a wing and fuselage comprising: a fore and an aft wing spar; a first bearing mounted internally of the aft wing spar; a second bearing mounted to the fore wing spar; a trunnion inserted internally through the aft wing spar and mounted such that the front portion of the trunnion is pivotally mounted in the second bearing supported on the fore spar, the midportion of the trunnion is pivotally mounted in the first bearing in the aft spar, and the aft portion of the trunnion is cantilevered rearwardly off from the aft spar; a landing gear oleo strut mounted to the cantilevered aft portion of the trunnion for rotation about the trunnion axis during extension and retraction of the landing gear; a fuselage wheel well compartment wherein the longitudinal length of said compartment is defined by an aft spar fuselage center section, a body bulkhead rearward of the aft spar fuselage center section forming the aft limit of the wheel well compartment; and said cantilevered trunnion rotational axis being skew positioned with respect to the aft wing spar so as to permit rotation of the main landing gear oleo and the multi-wheel truck attached thereto from an extended position for landing wherein the main landing gear multi-wheel trucks are in an inline transverse position such that upon landing of the aircraft in a laterally level attitude, all of the landing impact forces are simultaneously equally absorbed by the three post main landing gear for all angles of pitch attitude of the aircraft above the horizon, to a retracted position wherein all of the main landing gear multi-wheel trucks are stowed in the fuselage wheel well compartment so as to be juxtapositioned behind the aft spar fuselage center section for landing gear stowage independent of the sweep angle position of the aft wing spar.

7. A landing gear as recited in claim 6 wherein said first bearing comprises: an outer and an inner race, the outer race being circumferentially split and fixedly connected internally to the aft wing spar, the inner race being fixedly connected to the midportion of the trunnion and said outer race encapsulating the inner race for rotatably mounting the midportion of the trunnion for reacting landing loads through the aft spar.

8. A landing gear as recited in claim 6 wherein the trunnion midportion, which is supported by said encapsulating first bearing, has an integral continuous web structure in the cross-section plane through the encapsulating first bearing for carrying the aft spar shear web loads continuous through the trunnion cross-section.

9. A retractable four post four-wheel truck main landing gear for an aircraft having a wing and fuselage comprising: a fore and an aft wing spar; a trunnion inserted internally through the aft wing spar; a first bearing having an outer and an inner race, the outer race being circumferentially split and fixedly connected internally to the aft wing spar, the inner race being fixedly connected to the midportion of the trunnion and said outer race encapsulating the inner race for rotatably mounting the midportion of the trunnion for reacting landing loads through the aft spar; a second bearing mounted to the fore wing spar for rotatably mounting the front end of the trunnion; said trunnion being mounted to the fore and aft wing spar such that the front end of the trunnion is pivotally mounted in the second bearing supported on the fore spar, the midportion of the trunnion is pivotally mounted in the first encapsulating bearing in the aft spar for reacting landing loads through the spar, and the aft end of the trunnion is cantilevered rearwardly off from the aft spar; a landing gear oleo strut pivotally connected to the cantilevered end of the trunnion for rotation about the trunnion axis during extension and retraction of the landing gear; a fuselage wheel well compartment wherein the longitudinal length of said compartment is defined by an aft spar fuselage center section forming the forward limit of said compartment and a body bulkhead rearward of the aft spar fuselage center section forming the aft limit of the wheel well compartment; and said cantilevered trunnion rotational axis being skew positioned with respect to the aft wing spar so as to permit rotation of the main landing gear oleo and the four-wheel truck attached thereto from an extended position for landing wherein the four post four-wheel truck main landing gear is in an inline transverse position such that upon landing of the aircraft in a laterally level attitude, all of the landing impact forces are simultaneously equally absorbed by the four post main landing gear for all angles of pitch attitude of the aircraft above the horizon, to a retracted position wherein all of the main landing gear four-wheel trucks are stowed in the fuselage wheel well compartment so as to be juxtapositioned behind the aft spar fuselage center section for landing gear stowage independent of the sweep angle position of the aft wing spar.

* * * * *